United States Patent [19]

Hunnicutt

[11] Patent Number: 5,052,649
[45] Date of Patent: Oct. 1, 1991

[54] DRINK HOLDER ADAPTER

[76] Inventor: C. Douglas Hunnicutt, 1819 Rebsamen Park Dr., Little Rock, Ark. 72202

[21] Appl. No.: 625,038

[22] Filed: Dec. 10, 1990

[51] Int. Cl.$^5$ .............................................. A47K 1/08
[52] U.S. Cl. ........................... 248/311.2; 224/42.45 R
[58] Field of Search ........................... 248/311.2, 146; 220/85 H, 18; 215/100 R; 312/242; 224/42.45 R; 108/26; 297/194; 206/486

[56] References Cited

U.S. PATENT DOCUMENTS

| D. 287,789 | 1/1987 | Johnson | D3/40 |
|---|---|---|---|
| 3,842,981 | 10/1974 | Lambert | 211/74 |
| 4,163,374 | 8/1979 | Moore | 220/85 H X |
| 4,596,370 | 6/1986 | Adkins | 248/311.2 |
| 4,629,153 | 12/1986 | Marcum | 220/85 H X |
| 4,634,089 | 1/1987 | Wright et al. | 248/311.2 |
| 4,726,553 | 2/1988 | Wishusen | 248/146 |
| 4,765,581 | 8/1988 | Wallace et al. | 248/311.2 |
| 4,795,211 | 1/1989 | Stern et al. | 297/194 |
| 4,854,468 | 8/1989 | Dahlquist | 215/100 R |
| 4,874,109 | 10/1989 | Cook | 220/85 H X |
| 4,919,381 | 4/1990 | Buist | 224/42.45 R |
| 4,941,237 | 3/1976 | MacGregor | 220/85 H X |
| 4,974,741 | 12/1990 | Gustafson | 206/486 |

Primary Examiner—J. Franklin Foss
Attorney, Agent, or Firm—Walker & McKenzie

[57] ABSTRACT

A beverage holder adapter for placement into a beverage receptacle and for receiving a beverage container, such as a beer or carbonated drink can, held within an insulated beverage holder. The adapter includes a cylindrical upper portion with an inner diameter size for receiving the insulated beverage holder and a cylindrical lower portion with an outer diameter sized for placement into the beverage receptacle. The beverage holder adapter adapts the size of the receptacle, such as might be found in a vehicle or on a chair arm, and which is typically meant to hold a beverage container directly, to a size which can accommodate a beverage container held within an insulated beverage holder. The lower portion may include deformable ribs for contact with the inner surface of the beverage receptacle, holding and securing the adapter within the receptacle. The lower portion of the adapter tapers for use with variously dimensioned beverage receptacles and for ensuring secure contact between the ribs and the receptacle. The upper portion may also taper, allowing multiple adaptrs to be stackably packaged for shipment.

6 Claims, 2 Drawing Sheets

DRINK HOLDER ADAPTER

BACKGROUND OF THE INVENTION

1. Field of the Invention

The present invention relates, in general, to devices for holding beverage containers such as cans of beer, carbonated soft drinks, or other beverage containers.

2. Information Disclosure Statement

Many automobiles, vans, boats, and recreational vehicles, as well as stadium seats, tables, and lawn furniture have receptacles sized for the receipt of beverage containers, typically such as twelve ounce cans of carbonated soft drink or beer. Consumers of such beverages prefer that the beverages be chilled. A chilled beverage placed in such a receptacle quickly absorbs heat from the surrounding air as well as from the receptacle itself. Insulated beverage holders, typically made from foam rubber, are available for holding such chilled beverage containers and keeping them chilled, but have an outer diameter that is too large to allow placement within the typical beverage receptacles. It is therefore necessary to remove the beverage container from the insulated holder in order to place the container within the receptacle, thus negating the utility of the receptacle when used with a chilled beverage.

A preliminary patentability search produced the following patents, some of which may be relevant to the present invention: Lambert, U.S. Pat. No. 3,842,981, issued Oct. 22, 1974; Wright et al., U.S. Pat. No. 4,634,089, issued Jan. 6, 1987; Wallace et al., U.S. Pat. No. 4,765,581, issued Aug. 23, 1988; Stern et al., U.S. Pat. No. 4,795,211, issued Jan. 3, 1989; and Johnson, U.S. Pat. No. Des. 287,789, issued Jan. 20, 1987. While each of the above patents disclose various apparatus for holding beverage containers, none disclose or suggest the present invention. More specifically, none of the above patents disclose or suggest an adapter for use with a beverage receptacle and a beverage container inserted within an insulated beverage holder, said adapter comprising an upper portion and a lower portion, said upper portion having an inner diameter sized for receipt of the insulated beverage holder, and said lower portion having an outer diameter sized for placement into the beverage receptacle.

Lambert, U.S. Pat. No. 3,842,981, describes a beverage container holder mounted on a gimbel structure, for use in a moving vehicle. The present invention has no such gimbel structure, but might be used to adapt the Lambert patent for holding an insulated beverage holder.

Wright et al., U.S. Pat. No. 4,634,089, describes a universal cup holder having a pair of curved arms which securely encircle the top of a beverage container. The present invention has no such curved arms.

Similarly, Johnson, U.S. Pat. No. Des. 287,789, shows a drink cup holder for an automobile. The holder has a bottom platform, a frame, and a flat, circular top portion which holds the upper portion of the cup.

Wallace et al., U.S. Pat. No. 4,765,581, describes a universal cup holder with cup handle slot and a frame that may be attached to a vehicle. A resilient pusher element pushes the cup against a wall of the frame, allowing various cup sizes to be accommodated. The present invention is different in structure, and adapts an existing beverage receptacle for receipt of an insulated beverage holder.

Stern et al., U.S. Pat. No. 4,795,211, describes a beverage receptacle for attachment to the armrest of a stadium seat. The present invention is not, per se, a beverage receptacle, but instead adapts an existing receptacle for receipt of an insulated beverage holder.

SUMMARY OF THE INVENTION

The beverage holder adapter of the present invention adapts a beverage receptacle, such as might be found in the arm of a chair or in the surface of a table for holding a beverage container directly, to receipt of a beverage container held within an insulated beverage holder, typically constructed of foam rubber. The adapter is sized for snug placement within the beverage receptacle, and has an open end for receipt of the insulated beverage holder. A beverage container, typically such as a twelve ounce can of carbonated soft drink or beer, may remain within the insulated beverage holder, and the container and holder together may be inserted into and removed from the open end of the beverage holder adapter. In essence, the present invention adapts the beverage receptacle to a size which can hold the insulated beverage holder.

It is an object of the present invention to provide a beverage holder adapter which may be used with a variety of beverage receptacles having differing precise inner diameters. It is a further object of the present invention to provide securing means for holding the beverage holder adapter within the receptacle, and to provide for the compact stacking of several of the adapters for shipment.

DESCRIPTION OF THE PREFERRED EMBODIMENT

Figure 1:
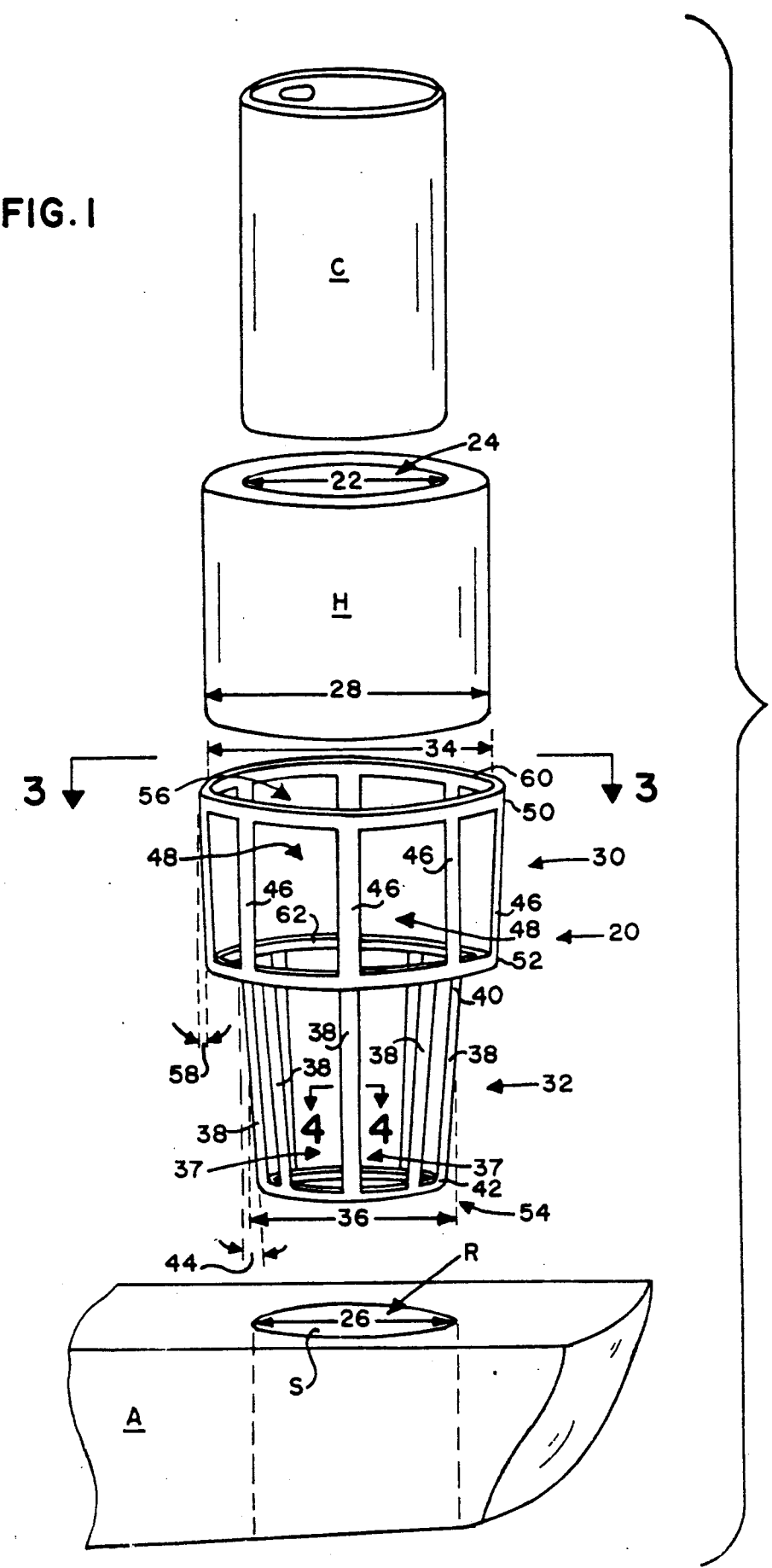
FIG. 1 is a view of the present invention, shown separated from a beverage container and insulated beverage holder, and removed from a beverage receptacle.

Referring to FIG. 1, the beverage adapter 20 is shown separated from beverage container C and insulated beverage holder H, and removed from beverage receptacle R. Well-known holder H, typically made of foam rubber or other insulating material, has an inner diameter 22 defining an opening 24 sized for receipt of container C, typically a well-known twelve ounce can of carbonated soft drink or beer. Beverage receptacle R is typically a hole or recess in a chair arm such as arm A. Those skilled in the art are familiar with similar receptacles within automobiles, vans, boats, and recreational vehicles, as well as stadium seats, table surfaces, and lawn furniture. Chair arm A and receptacle R are here used merely as a representative sample of the variety of beverage receptacles in use.

Receptacle R has an inner diameter 26, defining an inner surface S, sized for receipt of container C. Inner diameter 26 is typically only slightly larger than container C to prevent inadvertent tipping of container C. Outer diameter 28 of holder H, typically being larger than inner diameter 26 of receptacle R, prevents holder H from being inserted within receptacle R.

Beverage holder adapter 20, preferably constructed of low density polyethylene, is seen to have a substantially cylindrical upper portion 30 and a substantially cylindrical lower portion 32. Upper portion 30 has an inner diameter 34 sized for receipt of holder H, and lower portion 32 has an outer diameter 36 sized for placement into receptacle R. Although the particular diameters 34, 36 of respective portions 30, 32 are determined by the dimensions 28, 26 of holder H and receptacle R, respectively, diameter 34 typically will be larger than diameter 36 because of the particular geometries involved, as will now be apparent.

Beverage holder adapter 20 preferably comprises securing means for holding adapter 20 within receptacle R, such as deformable rib members 38 for frictional contact with inner surface S of receptacle R. The securing means retains adapter 20 within receptacle R when removing holder H from adapter 20 in a manner that will now be apparent. The securing means also retains an empty adapter 20 (i.e., with holder H removed) within receptacle R as, for instance, when receptacle R is within an automobile that is traveling over uneven terrain. Preferably, to accommodate adapter 20 to variously dimensioned receptacles R, outer diameter 36 (defined, for instance, by rib members 38) of lower portion 32 tapers from an upper outer diameter which is larger than inner diameter 26, as at point 40, to a lower outer diameter which is smaller than inner diameter 26, as at point 42. This taper, preferably at a pitch angle 44 between five and twelve degrees, not only allows adapter 20 to be used with variously dimensioned receptacles R, but also ensures secure contact between deformable rib members 38 and surface S. Deformable rib members 38 are seen preferably to be evenly spaced around lower portion 32 of adapter 20, and may be separated by openings 37 within lower portion 32 as shown.

Figure 2:
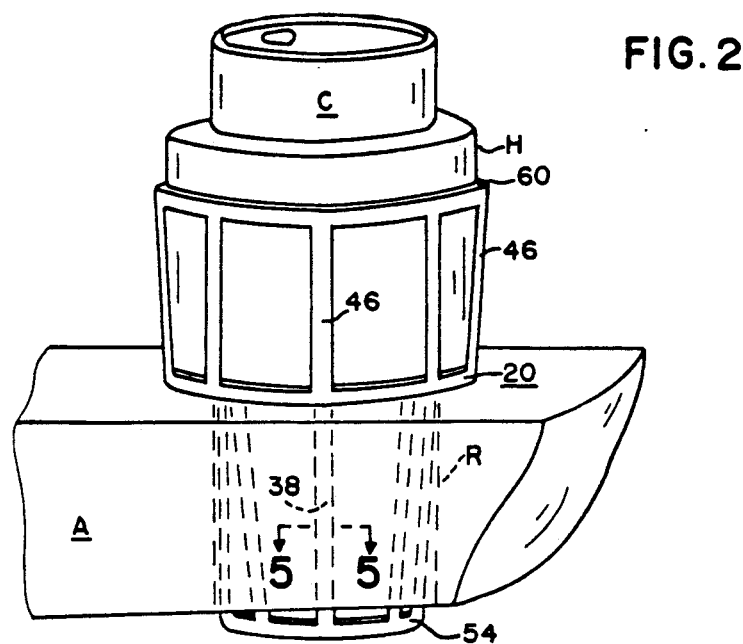
FIG. 2 is a view of the present invention placed within a beverage receptacle, and with an insulated beverage holder and beverage container inserted into the present invention.
Figure 4:
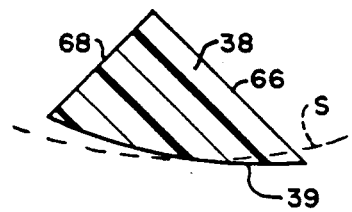
FIG. 4 is an enlarged sectional view of a deformable rib member taken along the lines 4—4 shown in FIG. 1.
Figure 5:
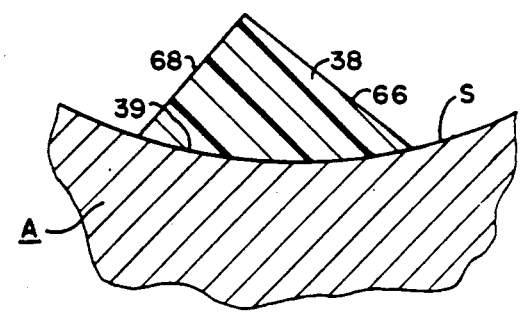
FIG. 5 is an enlarged sectional view of a deformable rib member taken along the lines 5—5 shown in FIG. 2, in contact with a beverage receptacle.

Deformable rib members 38 preferably have a cross-section and orientation as shown in FIG. 4. The dotted line in that Figure shows the final position of inner surface S of receptacle R when the adapter is inserted within the receptacle, as shown in FIG. 2. It should be noted that one edge 66 of rib member 38 may be longer than the other edge 68 of rib member 38, causing curved edge 39 of rib member, preferably shaped for contact with inner surface S, to be cocked in a manner requiring rib member 38 to be twistably deformed, in a manner well known to those skilled in the art, when adapter 20 is inserted within receptacle R. FIG. 5 shows a cross-section of the same rib member 38 thus twistably deformed when in contact with inner surface S, as when adapter 20 is inserted within receptacle R as shown, for instance, in FIG. 2. It will be understood that rib members 38 will also be slightly deformed vertically as adapter 20 is inserted within receptacle R, due to the tapering dimensions of lower portion 32 of adapter 20 in varying degrees of contact with inner surface S of receptacle R. The tension between deformed ribs 38 in contact with inner surface S will serve to secure adapter 20 within receptacle R in a manner now apparent to those skilled in the art.

Referring again to FIG. 1, upper portion 30 may be similarly defined by rib members 46 separated by openings 48 within upper portion 30, for a corresponding reduction in weight and material of adapter 20. Preferably, upper portion 30 tapers from a larger first diameter, as at point 50, to a smaller second diameter, as at point 52, allowing a multitude of adapters 20 to be stackably packaged for shipment, with bottom 54 of one receptacle 20 inserted into top opening 56 of another receptacle 20, in a manner that will now be apparent to those skilled in the art. This tapering of upper portion 30 is preferably at a taper angle 58 between five and twelve degrees, with the outer diameter of upper portion 30, measured at point 52 being smaller than the inner diameter of upper portion 30 measured at point 50, allowing successive adapters 20 to stackably fit within one another for shipment.

For structural rigidity, adapter 20 may have a lip 60 joined to ribs 46, a bottom 54, and a platform 62 joining upper portion 30 and lower portion 32. Platform 62, in addition to providing structural rigidity, also acts as a resting stop for holder H, allowing holder H to rest securely within adapter 20.

Figure 3:
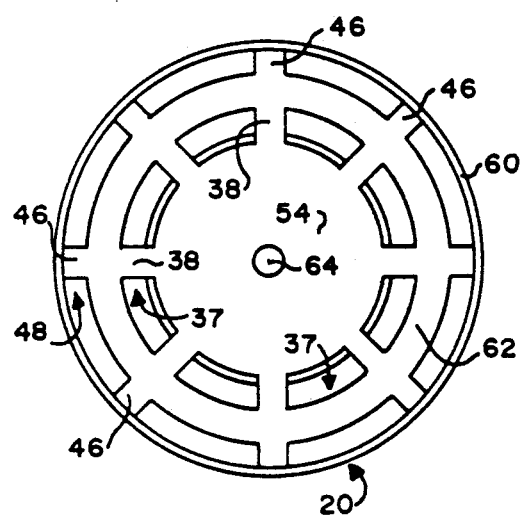
FIG. 3 is a top view of the present invention taken along the lines 3—3 shown in FIG. 1.

FIG. 2 shows adapter 20 placed within receptacle R, and holder H and container C placed within adapter 20. FIG. 3 shows a top view of adapter 20, with platform 62 clearly seen. Bottom 54 of adapter 20 may have one or more holes, such as hole 64, for allowing spilled liquids to drain, or, when holder 20 is used with outdoor lawn furniture, for preventing rain water from accumulating within adapter 20 in a manner that will now be apparent.

Although the present invention has been described and illustrated with respect to a preferred embodiment and a preferred use therefor, it is not to be so limited since modifications and changes can be made therein which are within the full intended scope of the invention.

I claim:

1. A beverage holder adapter for placement into a beverage receptacle and for receiving a beverage container held within an insulated removable beverage holder, said adapter comprising:
    a. a substantially cylindrical upper portion, said upper portion having an inner diameter sized for removably receiving the insulated beverage holder; and,
    b. a substantially cylindrical lower portion, said lower portion having an outer diameter sized for placement into the beverage receptacle; and,
    wherein the lower portion has openings therein and wherein the lower portion comprises securing means for retaining the beverage holder adapter within the beverage receptacle when removing the beverage holder from the beverage holder adapter and when the beverage holder adapter is empty, the beverage receptacle having an inner surface defining an inner diameter of the beverage receptacle, the securing means comprising deformable rib members for frictional contact with the inner surface of the beverage receptacle and the deformable rib members being spaced apart and separated by the openings in the lower portion.

2. The beverage holder adapter as described in claim 1, wherein the deformable rib members define the outer diameter of the lower portion, and further wherein the outer diameter of the lower portion is tapered from an upper outer diameter which is larger than the inner diameter of the beverage receptacle to a lower outer diameter which is smaller than the inner diameter of the beverage receptacle.

3. The beverage holder adapter as described in claim 2, wherein the inner diameter of the upper portion is larger than the upper outer diameter of the lower portion.

4. In combination,
  a. a beverage receptacle;
  b. an insulated removable beverage holder holding a beverage container; and,
  c. a beverage holder adapter comprising:
    i. a substantially cylindrical upper portion, said upper portion removably receivably holding the insulated beverage container; and,
    ii. a substantially cylindrical lower portion placed into the beverage receptacle; and,
  wherein the lower portion has openings therein and wherein the lower portion comprises securing means retaining the beverage holder adapter within the beverage receptacle when removing the beverage holder from the beverage holder adapter and when the beverage holder adapter is empty, the beverage receptacle having an inner surface defining an inner diameter of the beverage receptacle, the securing means comprising deformable rib members for frictional contact with the inner surface of the beverage receptacle and the deformable rib members being spaced apart and separated by the openings in the lower portion.

5. The combination as recited in claim 4, wherein the deformable rib members define an outer diameter of the lower portion, and further wherein the outer diameter of the lower portion is tapered from an upper outer diameter which is larger than the inner diameter of the beverage receptacle to a lower outer diameter which is smaller than the inner diameter of the beverage receptacle.

6. The combination as recited in claim 5, wherein the upper portion has an inner diameter which is larger than the upper outer diameter of the lower portion.

* * * * *